(12) United States Patent
Kosugi

(10) Patent No.: US 11,314,306 B2
(45) Date of Patent: Apr. 26, 2022

(54) ELECTRONIC APPARATUS AND CONTROL METHOD

(71) Applicant: LENOVO (SINGAPORE) PTE. LTD., Singapore (SG)

(72) Inventor: Kazuhiro Kosugi, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 240 days.

(21) Appl. No.: 16/777,849

(22) Filed: Jan. 30, 2020

(65) Prior Publication Data

US 2020/0363857 A1 Nov. 19, 2020

(30) Foreign Application Priority Data

May 17, 2019 (JP) .............................. JP2019-093715

(51) Int. Cl.

| | |
|---|---|
| *G06F 1/32* | (2019.01) |
| *G06F 1/3206* | (2019.01) |
| *G06F 1/3296* | (2019.01) |
| *G06F 1/3231* | (2019.01) |
| *G06F 1/324* | (2019.01) |
| *G06F 1/3234* | (2019.01) |
| *G06F 1/3287* | (2019.01) |

(52) U.S. Cl.
CPC ............ *G06F 1/3206* (2013.01); *G06F 1/324* (2013.01); *G06F 1/3231* (2013.01); *G06F 1/3265* (2013.01); *G06F 1/3287* (2013.01); *G06F 1/3296* (2013.01)

(58) Field of Classification Search
CPC ...... G06F 1/3206; G06F 1/3231; G06F 1/324; G06F 1/3265; G06F 1/3287; G06F 1/3296
See application file for complete search history.

(56) References Cited

U.S. PATENT DOCUMENTS

| | | | |
|---|---|---|---|
| 2015/0177817 A1* | 6/2015 | Badri | ..................... G06F 1/3231 713/320 |
| 2018/0157376 A1 | 6/2018 | Lemarchand | |

FOREIGN PATENT DOCUMENTS

| | | |
|---|---|---|
| JP | 07324792 A | 12/1995 |
| JP | 2012048676 A | 3/2012 |
| JP | 2014082595 A | 5/2014 |
| JP | 2016148895 A | 8/2016 |

\* cited by examiner

*Primary Examiner* — Stefan Stoynov
(74) *Attorney, Agent, or Firm* — Shimokaji IP

(57) ABSTRACT

An electronic apparatus includes a detection unit configured to detect a change from a state where a person is present to a state where the person is absent based on output of a distance sensor which detects an object present within a predetermined detection range, and a captured image covering a predetermined imaging range.

7 Claims, 7 Drawing Sheets

ELECTRONIC APPARATUS AND CONTROL METHOD

FIELD OF THE INVENTION

The present invention relates to an electronic apparatus and a control method.

BACKGROUND OF THE INVENTION

There is an electronic apparatus which makes a transition to a usable state when a person approaches and to a standby state in which functions except some of the functions are stopped when the person leaves (for example, see Japanese Unexamined Patent Application Publication No. 2016-148895).

SUMMARY OF THE INVENTION

However, a person using an electronic apparatus is not always staying neatly in front of the electronic apparatus and tends to move freely. Therefore, when the leave of the person from the electronic apparatus is detected, there is a possibility to detect the leave of the person erroneously due to changes in posture of the person or the like despite the fact that the person is using the electronic apparatus.

The present invention has been made in view of the above circumstances, and it is an object thereof to provide an electronic apparatus and a control method for detecting the leave of a person accurately.

The present invention has been made to solve the above problem, and an electronic apparatus according to the first aspect of the present invention includes a detection unit configured to detect a change from a state where a person is present to a state where the person is absent based on output of a distance sensor which detects an object present within a predetermined detection range, and a captured image covering a predetermined imaging range.

In the above electronic apparatus, when it is detected that an object present within the predetermined detection range is changed to a state where the object is absent based on the output of the distance sensor, the detection unit may detect whether a person is present within the predetermined imaging range or not based on the captured image, and based on the detection result, detect the change from the state where a person is present to the state where the person is absent.

In the above electronic apparatus, the detection unit may cause an imaging unit to capture an image within the predetermined imaging range according to the fact that the change from the state where an object is present within the predetermined detection range to the state where the object is absent is detected based on the output of the distance sensor.

In the above electronic apparatus, the predetermined imaging range may be a range wider than the predetermined detection range.

The above electronic apparatus may also be configured to further include: a system processing unit which executes system processing based on a system; and an operation control unit which, based on the detection result of the detection unit, instructs the system processing unit to cause an operating state of the system to make a transition to a first operating state in which at least part of the system processing is limited.

The above electronic apparatus may further be such that, when the change from the state where a person is present to the state where the person is absent is detected by the detection unit, the operation control unit instructs the system processing unit to cause the operating state of the system to make the transition to the first operating state after instructing the system processing unit to change the display content of a display unit on which a display image based on the system processing is displayed, and the detection unit causes the imaging unit to capture images, respectively, when the change in the display content of the display unit is instructed and when the transition to the first operating state is instructed, and detects the change from the state where a person is present to the state where the person is absent based on the captured images.

Further, the electronic apparatus may be such that, when a change from a state where a person is absent to a state where the person is present is detected in the first operating state by the detection unit based on the output of the distance sensor, the operation control unit instructs the system processing unit to make a transition to a second operating state in which the operation of the system is more activated than that in the first operating state.

A control method for an electronic apparatus according to the second aspect of the present invention includes: a step of causing a detection unit to acquire output of a distance sensor in order to detect an object present within a predetermined detection range; a step of causing the detection unit to acquire a captured image captured within a predetermined imaging range; and a step of causing the detection unit to detect a change from a state where a person is present to a state where the person is absent based on the output of the distance sensor and the captured image.

The above-described aspects of the present invention can detect the leave of a person from the electronic apparatus accurately.

DETAILED DESCRIPTION OF THE INVENTION

Embodiments of the present invention will be described below with reference to the accompanying drawings.

First Embodiment

Outline

First, the outline of an electronic apparatus 1 according to a first embodiment will be described. The electronic apparatus 1 according to the embodiment is, for example, a laptop PC (Personal Computer). Note that the electronic apparatus 1 may be an electronic apparatus of any other form, such as a desktop PC, a tablet terminal device, or a smartphone.

The electronic apparatus 1 can make a transition at least between a normal operating state (power-on state) and a standby state as system operating states. The normal operating state is an operating state capable of executing processing without the processing being particularly limited, which corresponds, for example, to S0 state defined in the ACPI (Advanced Configuration and Power Interface) specification. The standby state is a state in which at least part of system processing is limited. For example, the standby state may be the standby state or a sleep state, or a state corresponding to modern standby in Windows (registered trademark) or S3 state (sleep state) defined in the ACPI specification. For example, the standby state is an operating state lower in power consumption than the normal operating state.

In the following, a transition of the system operating state from the standby state to the normal operating state may be called "boot." In the standby state, since the activation level is generally lower than in the normal operating state, the boot of the system of the electronic apparatus 1 leads to the activation of the operation of the system in the electronic apparatus 1.

Figure 1A:
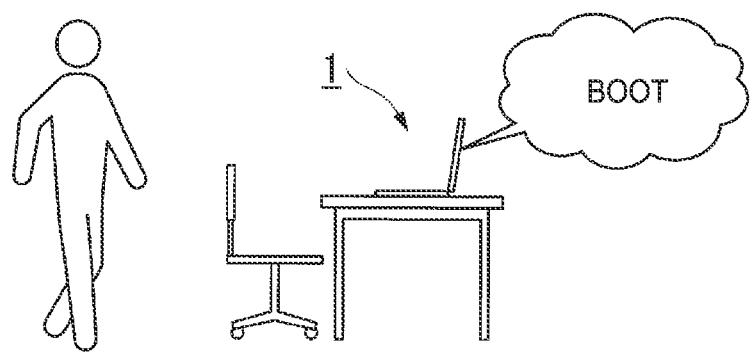
FIGS. 1A-1C are diagrams for describing an outline of HPD processing of an electronic apparatus according to a first embodiment.
Figure 1B:
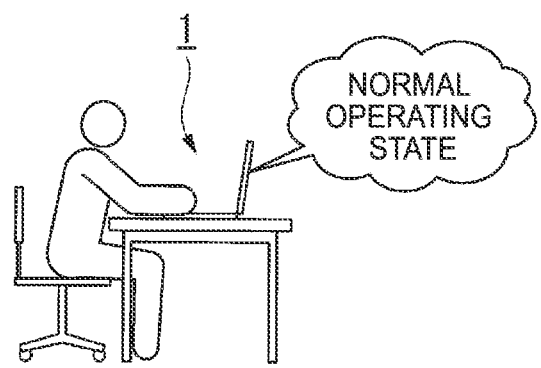
Figure 1C:
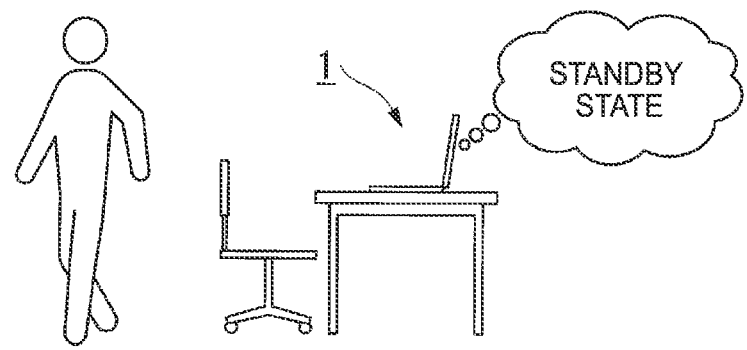

FIGS. 1A-1C are diagrams for describing an outline of HPD processing of the electronic apparatus 1 according to the embodiment. The electronic apparatus 1 includes a proximity sensor to be described later to detect a person present in the neighborhood of the electronic apparatus 1. This processing for detecting the presence of a person may also be called HPD (Human Presence Detection) processing. The electronic apparatus 1 detects a person present in the neighborhood of the electronic apparatus 1 to control the operating state of the system of the electronic apparatus 1 based on the detection result. For example, as illustrated in FIG. 1A, when detecting a change from a state where no person is present in front of the electronic apparatus 1 (Absence) to a state where a person is present (Presence), that is, when detecting that a person approaches the electronic apparatus 1 (Approach), the electronic apparatus 1 automatically boots the system to make a transition to the normal operating state. Further, in a state where the person is present in front of the electronic apparatus 1 (Presence) as illustrated in FIG. 1B, the electronic apparatus 1 imposes such a restriction on the system so as not to make a transition to the standby state and to continue the normal operating state. Then, as illustrated in FIG. 1C, when detecting a change from a state where the person is present in front of the electronic apparatus 1 (Presence) to a state where the person is absent (Absence), that is, when detecting that the person has left the electronic apparatus 1 (Leave), the electronic apparatus 1 causes the system to make the transition to the standby state.

Here, a person (user) using the electronic apparatus 1 is not always staying neatly in front of the electronic apparatus 1 and tends to move freely. However, since the detection FoV (Field of View) of the proximity sensor is generally narrow, there is a possibility to detect the leave of the person erroneously due to changes in posture of the person or the like. When the person leaving is erroneously detected, it is inconvenient because the transition to the standby state is made despite the fact that the user is using the electronic apparatus 1. Use of a proximity sensor wide in detection field of view (FoV) also causes a problem that the cost is high.

Therefore, the electronic apparatus 1 according to the embodiment increases detection accuracy by using a captured image for user authentication (i.e., with a camera assist) in addition to the detection result of the proximity sensor when detecting a person leaving while suppressing the cost by using a general proximity sensor. The captured image for user authentication is an image captured by an imaging unit (camera) provided in the electronic apparatus 1 to perform authentication using a face image as to whether the user using the electronic apparatus 1 is an authorized user or not. In comparison between the field of view (FoV) imaged by the imaging unit and the field of view detected by the proximity sensor, the field of view of the imaging unit is generally wider. Therefore, even if the user deviates from the field of view (detection field of view) detectable by the proximity sensor due to user's postural movement, the electronic apparatus 1 can detect the presence of the user as long as the user is in the field of view (imaging angle of view) imaged by the imaging unit.

Figure 2:
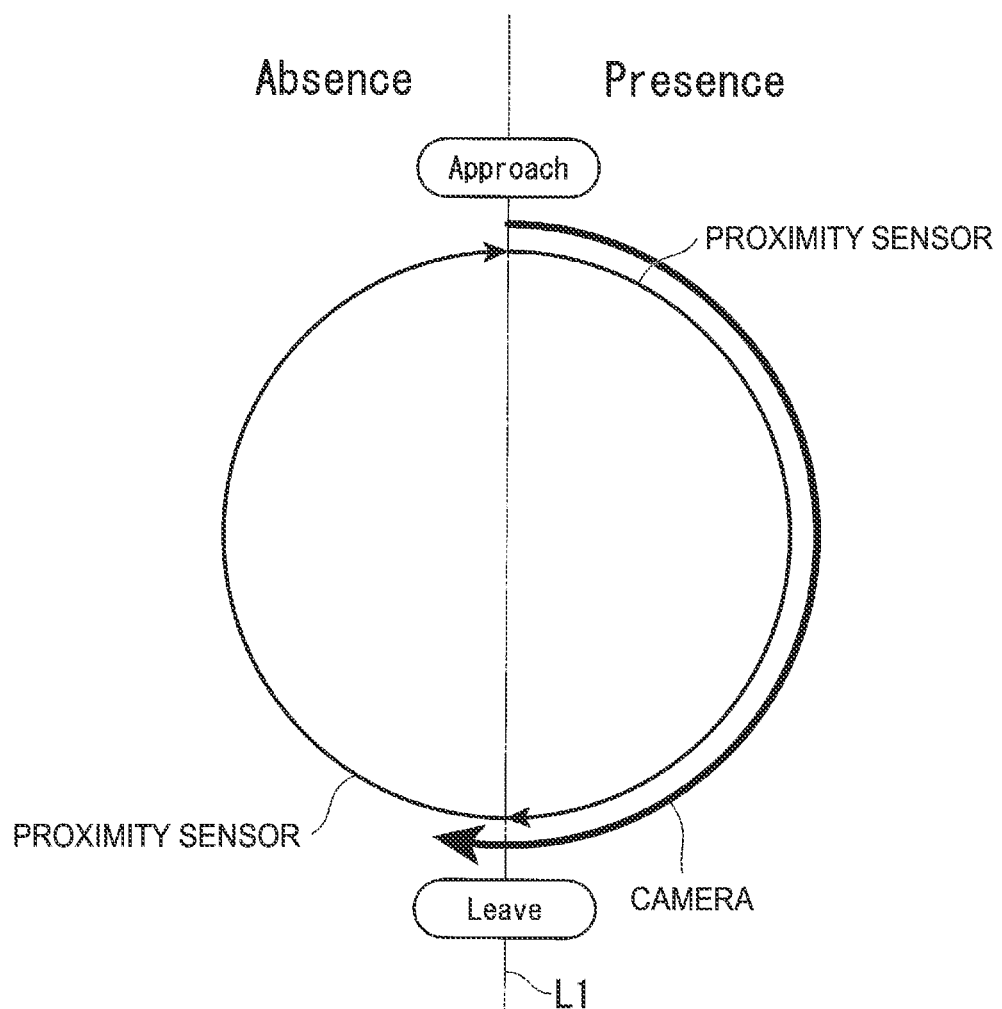
FIG. 2 is a diagram illustrating an outline of a detection method for the approach and leave of a person according to the first embodiment.

FIG. 2 is a diagram illustrating an outline of a detection method for the approach and leave of a person according to the embodiment. FIG. 2 schematically represents the detection of a transition between respective states by setting the left of a center line L1 as a border to be a state where no person is present in front of the electronic apparatus 1 (Absence) and the right thereof to be a state where a person is present in front of the electronic apparatus 1 (Presence). In the state where no person is present (Absence), the electronic apparatus 1 uses only the proximity sensor to detect a change to the state where a person is present (Presence) in order to detect the approach of a person (Approach). On the other hand, in the state where a person is present (Presence), the electronic apparatus 1 uses the imaging unit (camera) in addition to the proximity sensor to detect a change to the state where no person is present (Absence) in order to detect the leave of the person.

When the approach of a person (Approach) is detected, since there is a need to avoid detection in a case where a person other than the person using the electronic apparatus 1 cuts across in front of the electronic apparatus 1 by chance, or the like, it is better not to widen the detection range too much. Therefore, use of the proximity sensor alone to make detection is more appropriate. Further, since the detection of the approach of a person (Approach) is made when the electronic apparatus 1 is in the standby state, it is not desired to increase power consumption by booting the imaging unit. When the approach of a person (Approach) is detected, since the electronic apparatus 1 then boots the system and performs user authentication using the imaging unit on the way to make a transition to the normal operating state, there is no need to use the imaging unit at the stage of detecting the approach of a person (Approach). On the other hand, when the leave of a person (Leave) is detected, if the presence of the person cannot be detected from the detection range of the proximity sensor, the presence or absence of the person will be detected in a wider range using the imaging unit. Thus, it can be accurately detected whether the person has really left or not.

Next, the structure/configuration of the electronic apparatus 1 according to the embodiment will be described in detail.

External Structure of Electronic Apparatus

Figure 3:
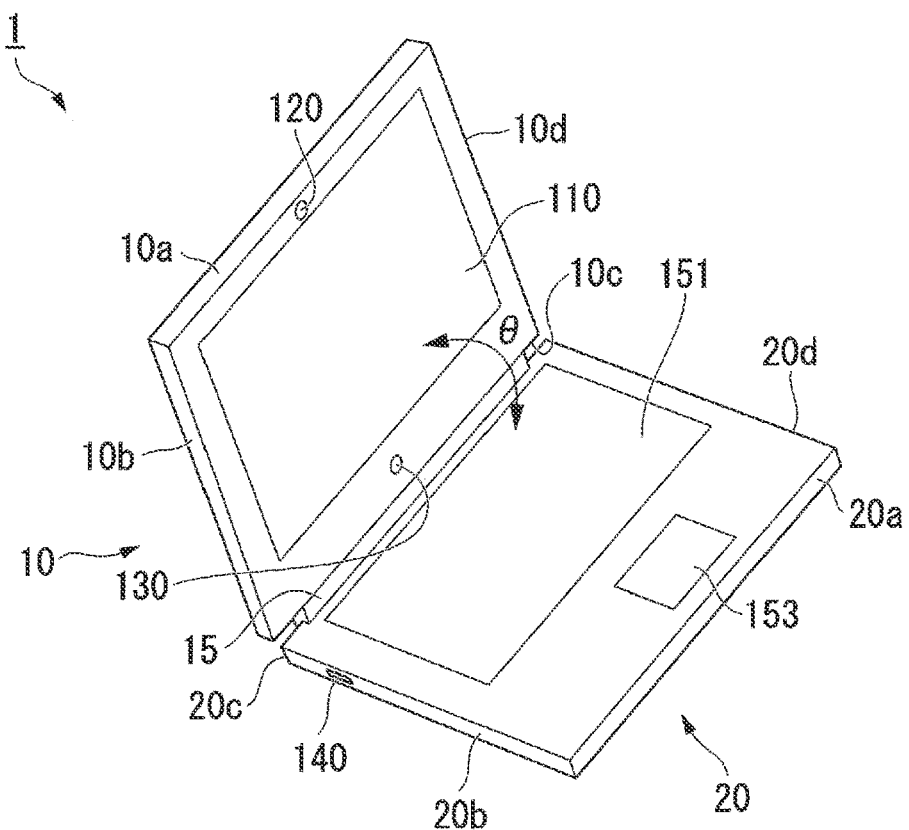
FIG. 3 is a perspective view illustrating an external structure example of the electronic apparatus according to the first embodiment.

FIG. 3 is a perspective view illustrating an external structure example of the electronic apparatus 1 according to the embodiment.

The electronic apparatus 1 includes a first chassis 10, a second chassis 20, and a hinge mechanism 15. The first chassis 10 and the second chassis 20 are coupled by using the hinge mechanism 15. The first chassis 10 is rotatable around an axis of rotation formed by the hinge mechanism 15 relative to the second chassis 20. The direction of the axis of rotation is parallel to side faces 10c and 20c on which the hinge mechanism 15 is placed.

The first chassis 10 is also called A cover or a display chassis. The second chassis 20 is also called C cover or a system chassis. In the following description, side faces on which the hinge mechanism 15 is provided among side faces of the first chassis 10 and the second chassis 20 are referred to as the side faces 10c and 20c, respectively. Among the side faces of the first chassis 10 and the second chassis 20, faces opposite to the side faces 10c and 20c are referred to as side faces 10a and 20a, respectively. In this figure, the direction from the side face 20a toward the side face 20c is referred to as "rear," and the direction from the side face 20c toward the side face 20a is referred to as "front." The right hand and left hand in the rearward direction are referred to as "right" and "left," respectively. The left side faces of the first chassis 10 and the second chassis 20 are referred to as side faces 10b and 20b, respectively, and right side faces are referred to as side faces 10d and 20d, respectively. Further, a state where the first chassis 10 and the second chassis 20 overlap each other and are completely closed (a state of open angle θ=0°) is referred to as a "closed state." The faces of the first chassis 10 and the second chassis 20 on the face-to-face sides in the closed state are referred to as respective "inner faces," and the faces opposite to the inner faces are referred to as "outer faces." Further, a state opposite to the closed state, where the first chassis 10 and the second chassis 20 are open, is referred to as an "open state."

The external appearance of the electronic apparatus 1 in FIG. 3 illustrates an example of the open state. The open state is a state where the side face 10a of the first chassis 10 and the side face 20a of the second chassis 20 are separated. In the open state, the inner faces of the first chassis 10 and the second chassis 20 appear so that the electronic apparatus 1 will be expected to be able to carry out normal operation. The open state is a state where the open angle θ between the inner face of the first chassis 10 and the inner face of the second chassis 20 is equal to or more than a predetermined angle, typically about 100° to 130°. Note that the range of open angles θ to be the open state can be set arbitrarily according to the range of angles rotatable by the hinge mechanism 15, or the like.

A display unit 110 is provided on the inner face of the first chassis 10. The display unit 110 is configured to include a liquid crystal display (LCD) or an organic EL (Electro Luminescence) display, and the like. Further, an imaging unit 120 and a proximity sensor 130 are provided in a peripheral area of the display unit 110 on the inner face of the first chassis 10. The imaging unit 120 is arranged on the side of the side face 10a in the peripheral area of the display unit 110. The proximity sensor 130 is arranged on the side of the side face 10c in the peripheral area of the display unit 110. Note that the positions in which the imaging unit 120 and the proximity sensor 130 are placed are just an example, and they may be positioned in any other places as long as they can face in a direction (frontward) to face the inner face of the first chassis 10.

In the open state, the imaging unit 120 captures an image of an object within a predetermined imaging range in the direction (frontward) to face the inner face of the first chassis 10. The predetermined imaging range is a range defined by an imaging angle of view defined by an image sensor included in the imaging unit 120 and an optical lens provided in front of an imaging surface of the image sensor.

The proximity sensor 130 detects an object (for example, a person) present within the detection range in a direction (frontward) to face the inner face of the first chassis 10. For example, the proximity sensor 130 is an infrared distance sensor configured to include a light-emitting part for emitting infrared light and a light-receiving part for receiving reflected light which is the infrared light returned after being emitted and reflected on the surface of the object. Specifically, the proximity sensor 130 detects, with a predetermined sampling frequency (for example, 1 Hz), light received by the light-receiving part, and outputs a detection signal according to the distance to the object (for example, the person) by using a triangulation method for calculating the distance based on the imaging position of the received light or a ToF (Time of Flight) method for converting, to a distance, a time difference from light-emitting to light-receiving, or the like.

Note that the proximity sensor 130 may be a sensor using infrared light emitted by a light-emitting diode, or a sensor using infrared laser emitting a light beam narrower in wavelength band than the infrared light emitted by the light-emitting diode. Further, the proximity sensor 130 is not limited to the infrared distance sensor, and it may be a sensor using any other method, such as an ultrasonic sensor or a sensor using an UWB (Ultra Wide Band) radar, as long as the sensor detects a distance to the object.

Figure 4:
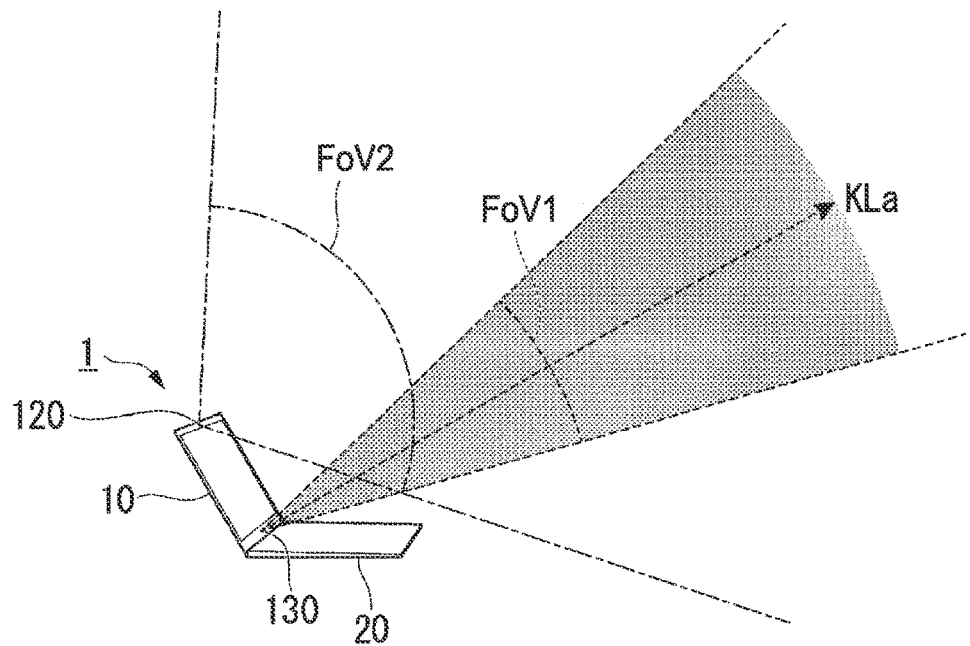
FIG. 4 is a schematic diagram illustrating the detection field of view of a proximity sensor and the imaging angle of view of an imaging unit.

FIG. 4 is a schematic diagram illustrating a detection field of view of the proximity sensor 130 and an imaging angle of view of the imaging unit 120. In the open state, the proximity sensor 130 arranged on the inner face of the first chassis 10 detects an object (for example, a person) present in a direction (frontward) to face the inner face of the first chassis 10. A detection field of view FoV1 indicates an angle (for example, 25° to 30°) detectable by the proximity sensor 130. The imaging unit 120 arranged on the inner face of the first chassis 10 captures an image of space in the direction (frontward) to face the inner face of the first chassis 10. An imaging angle of view FoV2 indicates the imaging angle of view captured by the imaging unit 120. Imaging angle of view FoV2 is an angle containing the detection field of view FoV1 and wider than the detection field of view FoV1. Note that the imaging angle of view FoV2 may be an angle including at least part of the detection field of view FoV1.

Further, a detection limit distance KLa of the proximity sensor 130 indicates a limit distance at which the proximity sensor 130 can detect the object (for example, the person). Therefore, a range defined by the detection field of view FoV1 and the detection limit distance KLa (for example, 120 cm) is a range (hereinafter called the "sensor detection range") in which the proximity sensor 130 can detect the object (for example, the person). On the other hand, an imaging range in which the imaging unit 120 captures an image is a range defined by the imaging angle of view FoV2, the distance direction of which is not particularly limited. In other words, the imaging range of the imaging unit 120 is a range wider in angle and distance than the sensor detection range of the proximity sensor 130.

Returning to FIG. 3, a power button 140 is provided on the side face 20*b* of the second chassis 20. The power button 140 is an operating element used by the user to give instructions to boot the system (making a transition from the standby state to the normal operating state) and to make a transition from the normal operating state to the standby state. Further, a keyboard 151 and a touch pad 153 are provided as an input device on the inner face of the second chassis 20. Note that a touch sensor may be included as the input device instead of or in addition to the keyboard 151 and the touch pad 153, or a mouse and an external keyboard may be connected. When the touch sensor is provided, an area corresponding to the display surface of the display unit 110 may be configured as a touch panel for accepting operations. Further, a microphone used to input voice may be included in the input device.

In the closed state where the first chassis 10 and the second chassis 20 are closed, the display unit 110, the imaging unit 120, and the proximity sensor 130 provided on the inner face of the first chassis 10 are covered with the inner face of the second chassis 20, and put in a state of being disabled from fulfilling the functions thereof. In the state where the first chassis 10 and the second chassis 20 are completely closed, the open angle θ is 0°.

Configuration of Electronic Apparatus

Figure 5:
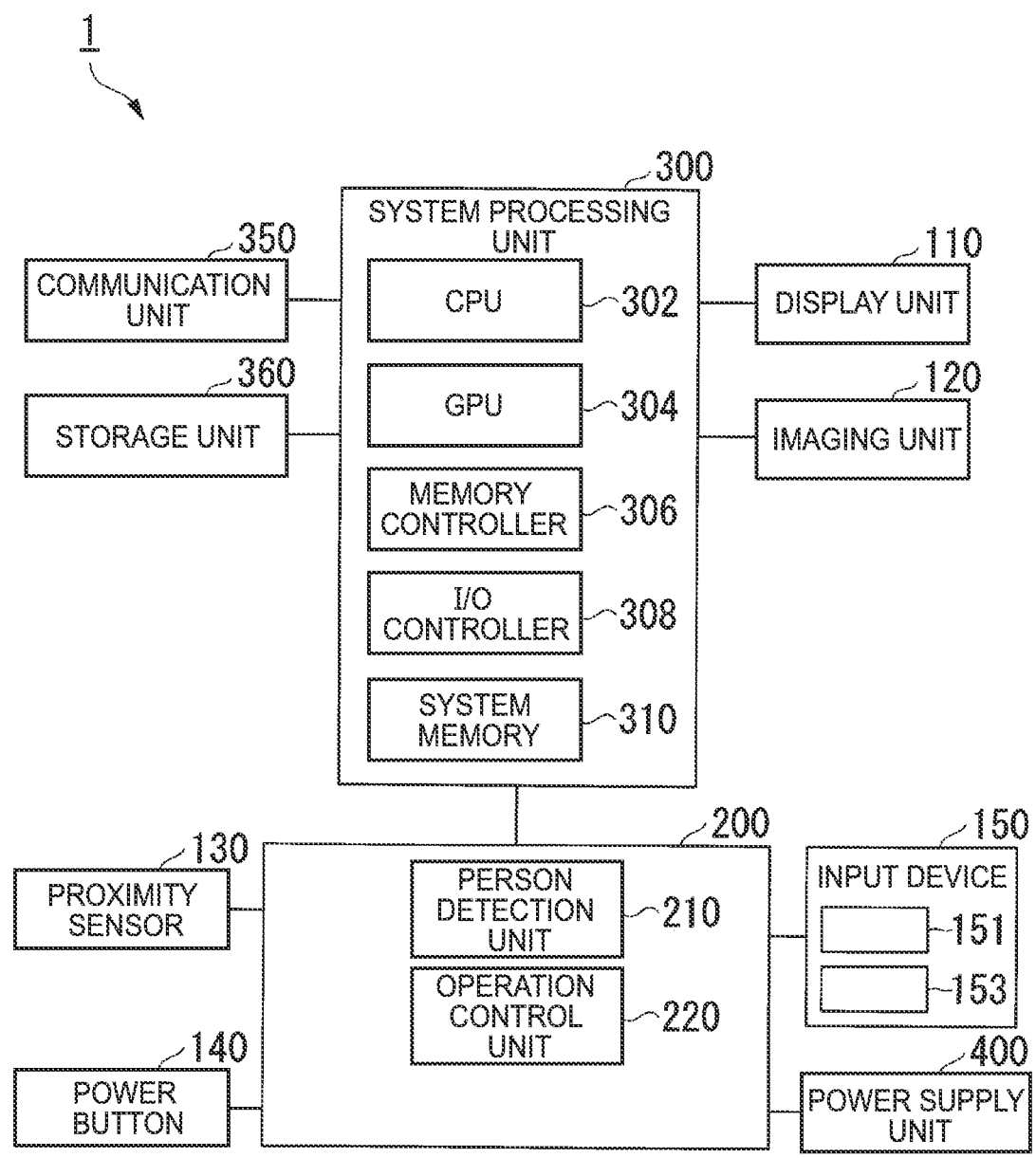
FIG. 5 is a schematic block diagram illustrating a configuration example of the electronic apparatus according to the first embodiment.

FIG. 5 is a schematic block diagram illustrating a configuration example of the electronic apparatus 1 according to the embodiment. The electronic apparatus 1 is configured to include the display unit 110, the imaging unit 120, the proximity sensor 130, the power button 140, an input device 150, an EC (Embedded Controller) 200, a system processing unit 300, a communication unit 350, a storage unit 360, and a power supply unit 400. The display unit 110 displays display data (images) generated based on system processing executed by the system processing unit 300, and processing of an application program running in the system processing, and the like.

The imaging unit 120 captures an image of an object within a predetermined angle of view in a direction (frontward) to face the inner face of the first chassis 10, and outputs the captured image to the system processing unit 300. For example, when the face of a person approaching the electronic apparatus 1 is contained within the angle of view of the imaging unit 120, the imaging unit 120 captures a face image of the person, and outputs the captured face image to the system processing unit 300. The imaging unit 120 may be an infrared camera or a normal camera. The infrared camera is a camera including an infrared sensor as an image sensor. The normal camera is a camera including, as an image sensor, a visible light sensor for receiving a visible light beam (for example, an RGB camera).

The proximity sensor 130 detects an object (for example, a person) present in a direction (frontward) to face the inner face of the first chassis 10, and outputs, to the EC 200, a detection signal indicative of the detection result. For example, the proximity sensor 130 outputs a detection signal according to the distance to an object (for example, a person) present in the direction (frontward) to face the inner face of the first chassis 10.

The power button 140 outputs, to the EC 200, operation signals according to user's operations. The input device 150 is an input unit for accepting user's input, which is configured to include, for example, the keyboard 151 and the touch pad 153. In response to accepting operations on the keyboard 151 and the touch pad 153, the input device 150 outputs, to the EC 200, operation signals indicative of the content of the operations.

The power supply unit 400 supplies power through a power system for supplying power to each unit of the electronic apparatus 1 according to the operating state of each unit. The power supply unit 400 includes a DC (Direct Current)/DC converter. The DC/DC converter converts the voltage of DC power, supplied from an AC (Alternate Current)/DC adapter or a battery pack, to a voltage required for each unit. The power with the voltage converted by the DC/DC converter is supplied to each unit through each power system. For example, the power supply unit 400 supplies power to each unit through each power system based on a control signal according to the operating state of each unit input from the EC 200.

The EC 200 is a microcomputer configured to include a CPU (Central Processing Unit), a RAM (Random Access Memory), a ROM (Read Only Memory), an I/O (Input/Output) logic circuit, and the like. The CPU of the EC 200 reads a control program (firmware) prestored in the ROM thereof and executes the read control program to fulfill the function. The EC 200 operates independently of the system processing unit 300 to control the operation of the system processing unit 300 and manage the operating state of the system processing unit 300. The EC 200 is connected to the proximity sensor 130, the input device 150, and the power supply unit 400.

For example, the EC 200 communicates with the power supply unit 400 to acquire information on a battery state (remaining battery capacity, and the like) from the power supply unit 400 and to output, to the power supply unit 400, a control signal or the like in order to control the supply of power according to the operating state of each unit of the electronic apparatus 1. Further, the EC 200 acquires operation signals from the power button 140 and the input device 150, and outputs, to the system processing unit 300, an operation signal related to processing of the system processing unit 300 among the acquired operation signals. Further, the EC 200 acquires a detection signal indicative of the detection result from the proximity sensor 130 to execute the HPD processing based on the detection result. For example, as a functional configuration related to the HPD processing, the EC 200 includes a person detection unit 210 and an operation control unit 220.

Based on the output (detection signal) of the proximity sensor 130, the person detection unit 210 detects, with a predetermined sampling frequency (for example, 1 Hz), an object (for example, a person) present within the sensor detection range and a distance to the object. Here, the detection signal acquired from the proximity sensor 130 is acquired regardless of whether the object is a person or an object other than the person. When the object present within the sensor detection range is no longer detected, or when an object which has not been present within the sensor detection range is detected, the object is a moving object and can be roughly estimated as a person from the situation. In the following description, the fact that the person detection unit 210 detects an object (for example, a person) may be simply stated that the person detection unit 210 detects a person. In other words, the fact that the person detection unit 210 detects a person includes that the person detection unit 210 not only detects a person, but also detects an object other than the person.

For example, based on the detection signal acquired from the proximity sensor 130, the person detection unit 210 detects a state where a person is present within the sensor detection range or a state where no person is present. Further, based on the detection signal acquired from the proximity sensor 130, when detecting a change from the state where no person is present within the sensor detection range to the state where a person is present, the person detection unit 210 determines that the person approaches in front of the electronic apparatus 1 and detects the approach of the person to the electronic apparatus 1.

Further, based on the detection signal acquired from the proximity sensor 130 and a captured image captured by the imaging unit 120, when detecting a change from a state where a person is present to a state where the person is absent, the person detection unit 210 determines that the person present in front of the electronic apparatus 1 has left and detects the leaving of the person from the electronic apparatus 1. Specifically, the person detection unit 210 causes the imaging unit 120 to capture an image within the imaging range according to the fact that the change from the state where the person is present within the sensor detection range to the state where the person is absent is detected based on the detection signal acquired from the proximity sensor 130. Specifically, the person detection unit 210 causes the imaging unit 120 to capture an image under the control of the system processing unit 300 by sending the system processing unit 300 a control signal for causing the imaging unit 120 to capture the image.

Then, based on the captured image captured by the imaging unit 120, the person detection unit 210 detects whether the person is present within the imaging range or not to detect the change from the state where the person is present to the state where the person is absent (i.e., the leave of the person (i.e., the person leaving) from the electronic apparatus 1) based on the detection result. Specifically, when determining that the person is absent within the imaging range based on the captured image captured by the imaging unit 120, the person detection unit 210 detects that the person has left the electronic apparatus 1. On the other hand, when determining that the person is present within the imaging range based on the captured image, the person detection unit 210 determines that the person did not leave the electronic apparatus 1 (i.e., the person is present in front of the electronic apparatus 1).

Note that the detection of the person from the captured image can be achieved, for example, by detecting a face image from the captured image. Any known face detection technique can be applied to detecting the face image. Note that it may be detected that the person is present within the imaging range only when the size of the face image to be detected (the size of the face image relative to the whole captured image) is larger than a predetermined threshold value. Thus, the electronic apparatus 1 can inhibit a person present in front of the electronic apparatus 1 but not using the electronic apparatus 1 from being detected erroneously as the person (user) using the electronic apparatus 1.

The operation control unit 220 controls the operating state of the system according to the HPD processing. For example, in the standby state, when a change from a state where the person is absent in front of the electronic apparatus 1 to a state where the person is present (i.e., the approach of the person to the electronic apparatus 1) is detected by the person detection unit 210, the operation control unit 220 boots the system in the standby state. Specifically, when the approach of the person to the electronic apparatus 1 is detected by the person detection unit 210, the operation control unit 220 instructs the system processing unit 300 to boot the system. More specifically, when booting the system, the operation control unit 220 outputs the control signal to the power supply unit 400 to supply power necessary for the operation of each unit of the electronic apparatus 1. After that, the operation control unit 220 outputs a boot signal to the system processing unit 300 to give an instruction to boot the system. When acquiring the boot signal, the system processing unit 300 boots the system to make a transition from the standby state to the normal operating state.

Further, when the person detection unit 210 is continuously detecting a state where the person is present in front of the electronic apparatus 1, the operation control unit 220 restricts the system not to make a transition to the standby state by the system processing unit 300 so as to continue the normal operating state. However, even when the person detection unit 210 continues detecting the presence of the person, the operation control unit 220 may make a transition from the normal operating state to the standby state depending on a predetermined condition (for example, when the duration of non-operation lasts for a preset period of time).

Further, in the normal operation, when the change from the state where the person is present in front of the electronic apparatus 1 to the state where the person is absent (i.e., the leave of the person from the electronic apparatus 1) is detected by the person detection unit 210, the operation control unit 220 instructs the system processing unit 300 to cause the system to make the transition from the normal operating state to the standby state. More specifically, the operation control unit 220 outputs a standby signal to the system processing unit 300 to give an instruction to cause the system to make the transition from the normal operating state to the standby state. When acquiring the standby signal, the system processing unit 300 causes the system to make the transition from the normal operating state to the standby state. After that, the operation control unit 220 outputs a control signal to the power supply unit 400 to stop the supply of power unnecessary in the standby state.

When the leave of the person from the electronic apparatus 1 is detected, the operation control unit 220 may instruct the system processing unit 300 to cause the operating state of the system to make the transition to the standby state after instructing the system processing unit to change the display of the display unit 110 on which a display image based on the system processing is displayed. The display change is, for example, to put the display into a screen-OFF state so as to make the display image (the display image according to the system processing) being displayed on the display unit 110 invisible, such as to display a black image (or an image gradually turning black) or to decrease the display brightness of the display unit 110 (for example, backlight brightness in the case of a liquid crystal display (LCD)). When an image gradually turning black is displayed, the operation control unit 220 may display a black image the transparency of which is gradually changed from 100% to 0% in such a manner as to be superimposed on the display image according to the system processing. According to the above instruction, the system processing unit 300 may cause the operating state of the system to make the transition to the standby state after displaying, on the display unit 110, the black image (or the image gradually turning black) for a fixed period of time.

In addition to the HPD processing, the operation control unit 220 controls the operating state of the system based on an operation on the power button 140, and an operation on the input device 150 to select an operation control menu (logout (signout), sleep, shutdown, reboot, or the like) prepared on the OS. For example, the operation control unit 220 acquires an operation signal from the power button 140 to instruct the system processing unit 300 to cause the operating state of the system to make a transition to the normal operating state or the standby state based on the acquired operation signal. For example, when acquiring an operation signal indicating that the power button 140 is pressed down in the standby state, the operation control unit 220 outputs a control signal (boot signal) to the system processing unit 300 to boot the system. Further, when acquiring an operation signal indicating that the power button 140 is pressed down in the normal operating state, the operation control unit 220 outputs a control signal to the system processing unit 300 to cause the operating state of the system to make the transition from the normal operating state to the standby state. More specifically, for example, in the normal operating state, when acquiring an operation signal indicating that the power button 140 is pressed down for a time shorter than a predetermined time, the operation control unit 220 may output a control signal to cause the operating state of the system to make a transition to a sleep state, while when acquiring an operation signal indicating that the power button 140 is pressed down for a time longer than the predetermined time (long-press operation), the operation control unit 220 may output a control signal to cause the operating state of the system to make a transition to a shutdown state.

The system processing unit 300 is configured to include a CPU (Central Processing Unit) 302, a GPU (Graphic Processing Unit) 304, a memory controller 306, an I/O (Input-Output) controller 308, a system memory 310, and an authentication processing unit 321, where processes of various application programs are executable on an OS (Operating System) by system processing based on the OS. The CPU 302 and the GPU 304 may be collectively called a processor.

The CPU 302 executes processes by the OS and processes by an application program(s) running on the OS. Further, the CPU 302 makes a transition of the operating state of the system by the HPD processing performed by the EC 200 based on the detection result of the proximity sensor 130. For example, when the operating state is the standby state and the boot signal is input from the EC 200, the CPU 302 executes boot processing for making a transition from the standby state to the normal operating state. For example, in the case where the operating state is the sleep state, a hibernation state, or a power-off state, when power is supplied from the power supply unit 400 and the boot signal is input from the EC 200, the CPU 302 starts boot processing. In the boot processing, the CPU 302 detects and initializes the minimum devices such as the system memory 310, the storage unit 360, and the like (pre-boot). The CPU 302 loads system firmware from the storage unit 360 into the system memory 310 to detect and initialize the other devices such as the communication unit 350 and the display unit 110 (post-processing). Initialization includes processing such as initial parameter settings. In the case of a transition (resume) from the sleep state to the normal operating state, part of the post-processing may be omitted. After completion of the boot processing, the CPU 302 starts execution of the system processing based on the OS (boot). For example, when the operating state is the standby state and the boot signal is input from the EC 200, the CPU 302 resumes execution of an application program(s) the execution of which has been stopped.

In the boot processing, the CPU 302 executes login processing to determine whether to allow access to the OS or not. When the boot processing by the OS is started, the CPU 302 executes the login processing before allowing access to the OS, and the transition to the normal operating state is paused until login is allowed in the login processing. In the login processing, user authentication processing is performed to determine whether the person using the electronic apparatus 1 is a preregistered, authorized user or not. As the authentication, there are password authentication, face authentication, fingerprint authentication, and the like. In the embodiment, an example of using face authentication processing will be described. The CPU 302 executes face authentication processing based on a face image of the person captured by the imaging unit 120. When the authentication result is successful, the CPU 302 allows the login and resumes the execution of the paused system processing. On the other hand, when the authentication result is unsuccessful, the CPU 302 leaves the execution of the boot processing paused without allowing the login.

The GPU 304 is connected to the display unit 110. The GPU 304 executes image processing under the control of the CPU 302 to generate display data. The GPU 304 outputs the generated display data to the display unit 110. Note that the CPU 302 and the GPU 304 may be integrally formed as one core, or the load may be shared between the CPU 302 and the GPU 304 formed as individual cores, respectively. The number of processors is not limited to one, and it may be plural.

The memory controller 306 controls reading data from and writing data to the system memory 310, the storage unit 360, and the like, by the CPU 302 and the GPU 304.

The I/O controller 308 controls input/output of data from the communication unit 350, the display unit 110, and the EC 200.

The system memory 310 is used as a reading area of an execution program of the processor and a working area to write processed data.

The communication unit 350 is connected to other devices communicably through a wireless or wired communication network to send and receive various data. For example, the communication unit 350 is configured to include a wired LAN interface such as the Ethernet (registered trademark), a wireless LAN interface such as Wi-Fi (registered trademark), and the like.

The storage unit 360 is configured to include storage media, such as an HDD (Hard Disk Drive), a secure NVRAM (Non-Volatile RAM), a ROM (Read Only Memory), and the like. The HDD stores the OS, device drivers, various programs such as applications, and various data acquired by the operation of the programs. In the secure NVRAM, authentication data used to authenticate each user are stored. Stored in the authentication data are identification information of each user and authentication information in association with each other. The secure NVRAM is protected (locked) not to be able to be accessed from an OS operating environment via the I/O controller 308. Note, however, that the lock is released upon power-on and reset of the CPU 302, and the system firmware is executed upon completion of the pre-boot to start the lock.

Operation of Operating State Control Processing by HPD Processing

Next, the operation of operating state control processing for controlling the operating state of the system by the HPD processing will be described. First, the operation of boot processing to boot the system when the EC 200 detects the approach of a person to the electronic apparatus 1 will be described.

Figure 6:
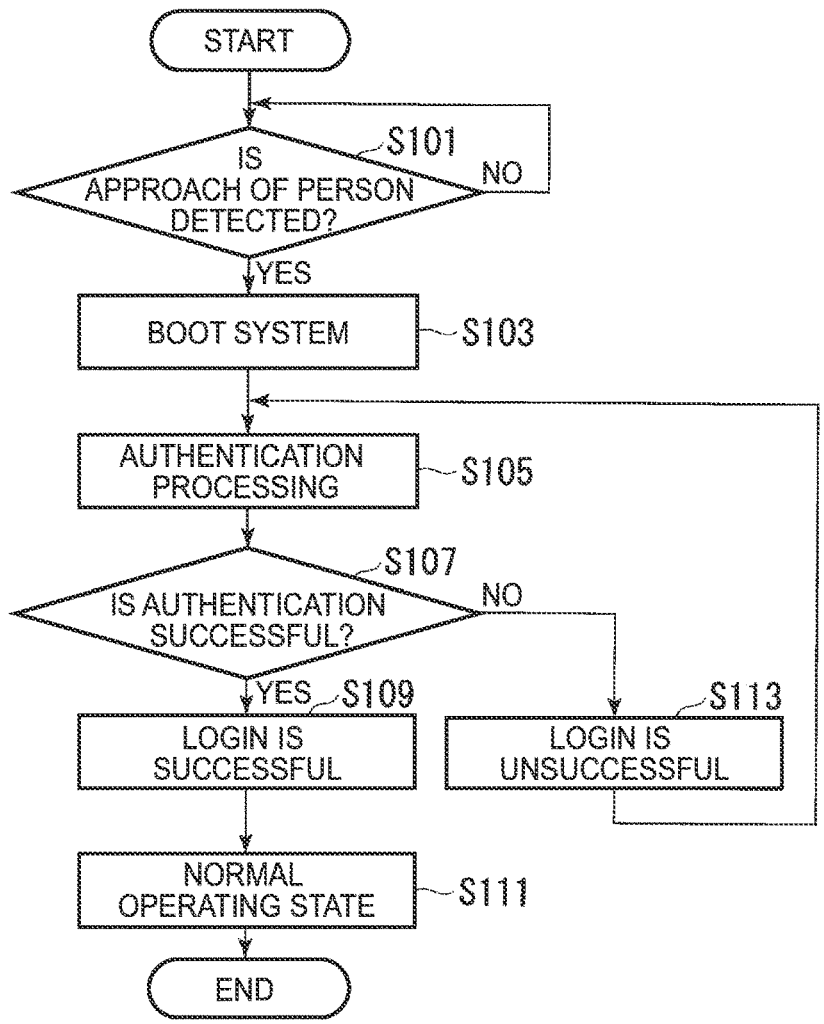
FIG. 6 is a flowchart illustrating an example of boot control according to the first embodiment.

FIG. 6 is a flowchart illustrating an example of boot control according to the embodiment. Here, it is assumed that the electronic apparatus 1 is placed open on a desk or the like in the standby state.

(Step S101) Based on a detection signal acquired from the proximity sensor 130, the EC 200 determines whether the approach of a person to the electronic apparatus 1 is detected or not. When a change from the state where no person is present to the state where a person is present is detected, the EC 200 determines that the approach of a person to the electronic apparatus 1 is detected. Further, when the absence of a person is continuously being detected, the EC 200 determines that the approach of a person to the electronic apparatus 1 is not detected. Then, when determining that the approach of a person to the electronic apparatus 1 is not detected (NO), the EC 200 performs processing in step S101 again. On the other hand, when determining that the approach of a person to the electronic apparatus 1 is detected (YES), the EC 200 proceeds to processing in step S103.

(Step S103) The EC 200 boots the system by the system processing unit 300. Specifically, when booting the system by the system processing unit 300, the EC 200 outputs, to the power supply unit 400, the control signal to supply power necessary for the operation of each unit of the electronic apparatus 1. Further, the EC 200 outputs the boot signal to the system processing unit 300 to give the instruction to boot the system. When acquiring the boot signal, the system processing unit 300 starts the boot processing. Then, the procedure proceeds to processing in step S105.

(Step S105) The system processing unit 300 executes login processing (authentication processing). For example, the system processing unit 300 executes the login processing by face authentication based on a captured image acquired from the imaging unit 120, and proceeds to processing in step S107.

(Step S107) The system processing unit 300 determines whether the authentication result is successful or not. When determining that the authentication result is successful (YES), the system processing unit 300 proceeds to processing in step S109. On the other hand, when determining that the authentication result is unsuccessful (NO), the system processing unit 300 proceeds to processing in step S113.

(Step S109) When the authentication result is successful, the system processing unit 300 gives a notification that the login is successful (for example, displays the notification on the display unit 110), and continues the boot processing. Then, the procedure proceeds to processing in step S111.

(Step S111) The system processing unit 300 completes the login processing and causes the operating state of the system to make a transition to the normal operating state.

(Step S113) When the authentication result is unsuccessful, the system processing unit 300 gives a notification that the login is unsuccessful (for example, displays the notification on the display unit 110), and returns to the authentication processing in step S105. When the authentication processing is unsuccessful continuously a predetermined number of times, the system processing unit 300 may stop the authentication processing and make a transition to a state of disabling the login.

Next, the operation of standby-state transition processing to cause the system to make the transition from the normal operating state to the standby state according to the fact that the EC 200 detects the leave of a person from the electronic apparatus 1 will be described.

Figure 7:
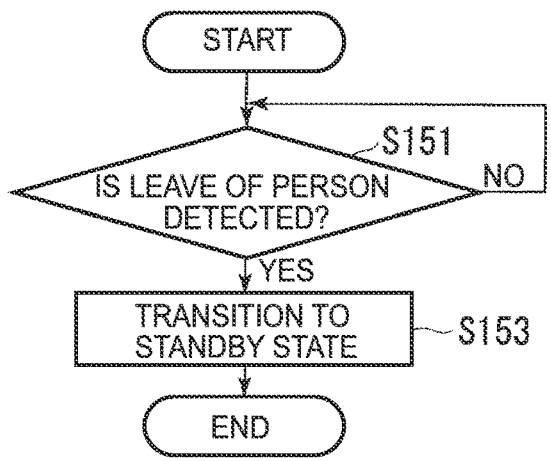
FIG. 7 is a flowchart illustrating an example of standby-state transition processing according to the first embodiment.

FIG. 7 is a flowchart illustrating an example of the standby-state transition processing according to the embodiment. Here, it is assumed that the electronic apparatus 1 is placed on the desk or the like in the open state and the operating state thereof is the normal operating state.

(Step S151) Based on the detection signal acquired from the proximity sensor 130 and a captured image captured by the imaging unit 120, the EC 200 determines whether the leave of a person from the electronic apparatus 1 is detected or not. Note that the operation of leave detection processing for detecting a person leaving will be described later with reference to FIG. 8. When the change from the state where a person is present to the state where the person is absent is detected, the EC 200 determines that the leave of the person from the electronic apparatus 1 is detected. On the other hand, when the presence of the person is continuously being detected, the EC 200 determines that the leave of the person from the electronic apparatus 1 is not detected. Then, when the leave of the person from the electronic apparatus 1 is not detected (NO), the EC 200 performs the processing in step S151 again. On the other hand, when the leave of the person from the electronic apparatus 1 is detected (YES), the EC 200 proceeds to processing in step S153.

(Step S153) The EC 200 causes the operating state of the system by the system processing unit 300 to make the transition from the normal operating state to the standby state. Specifically, the EC 200 outputs the standby signal to the system processing unit 300 to give the instruction to cause the system to make the transition to the standby state. When acquiring the standby signal, the system processing unit 300 causes the operating state of the system to make the transition from the normal operating state to the standby state. Further, the EC 200 outputs the control signal to the power supply unit 400 to stop the supply of power unnecessary in the standby state.

Operation of Leave Detection Processing

Figure 8:
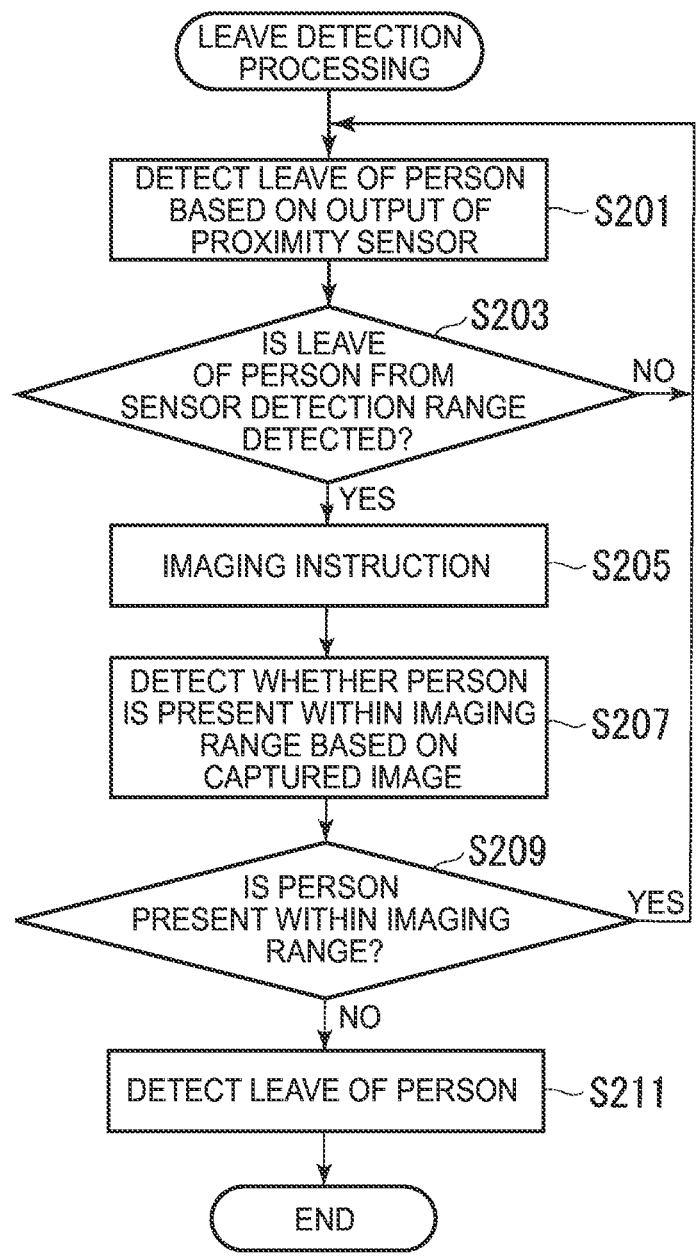
FIG. 8 is a flowchart illustrating an example of leave detection processing according to the first embodiment.

Referring next to FIG. 8, the operation of leave detection processing for detecting a person leaving will be described. FIG. 8 is a flowchart illustrating an example of the leave detection processing according to the embodiment.

(Step S201) Based on the output (detection signal) of the proximity sensor 130, the EC 200 detects whether the change from the state where the person is present within the sensor detection range to the state where the person is absent (i.e., the leave of the person from the sensor detection range) is detected or not. Then, the EC 200 proceeds to processing in step S203.

(Step S203) Based on the output (detection signal) of the proximity sensor 130, the EC 200 determines whether the state where the person is present within the sensor detection range is changed to the state where the person is absent (i.e., the leave of the person from the sensor detection range) or not. When determining that the person present within the sensor detection range remains present (NO), the EC 200 returns to the processing in step S201. On the other hand, when determining that the person present within the sensor detection range is changed to the state where the person is absent (YES), the EC 200 proceeds to processing in step S205.

(Step S205) The EC 200 causes the imaging unit 120 to capture an image (imaging instruction). Specifically, the person detection unit 210 sends the system processing unit 300 a control signal for causing the imaging unit 120 to capture an image to cause the imaging unit 120 to capture an image under the control of the system processing unit 300. Then, the procedure proceeds to processing in step S207.

(Step S207) Based on the captured image captured by the imaging unit 120, the EC 200 detects whether a person is present within the imaging range or not. Specifically, the EC 200 detects a face image from the captured image to detect whether a person is present within the imaging range or not. Then, the EC 200 proceeds to processing in step S209.

(Step S209) The EC 200 determines whether a person is present within the imaging range or not. When detecting the face image from the captured image, the EC 200 determines that the person is present within the imaging range (YES). In this case, since the person does not leave, the EC 200 returns to the processing in step S201. On the other hand, when the face image is not detected from the captured image, the EC 200 determines that the person is absent within the imaging range (NO), and proceeds to processing in step S211.

(Step S211) Since the absence of the person within the imaging range is determined, the EC 200 detects that the person has left the electronic apparatus 1. In response to this detection, the system processing unit 320 causes the operating state of the system to make the transition to the standby state (see step S153 in FIG. 7).

Summary of First Embodiment

As described above, the electronic apparatus 1 according to the embodiment includes the person detection unit 210 for detecting a change from a state where a person is present to a state where the person is absent (i.e., the leave of the person from the electronic apparatus 1) based on output of the proximity sensor 130 (an example of a distance sensor) for detecting an object (for example, a person) present within the sensor detection range (an example of a predetermined detection range), and a captured image captured within the predetermined imaging range.

Thus, since the electronic apparatus 1 detects the presence or absence of a person using the captured image in addition to the detection result of the proximity sensor 130, the leave of the person from the electronic apparatus 1 can be detected accurately. For example, the electronic apparatus 1 can avoid erroneously detecting that the user has left just due to changes in posture of the user despite the fact that the user is using the electronic apparatus 1. Thus, the electronic apparatus 1 can detect the presence or absence of a person properly.

For example, when detecting that an object (for example, a person) present within the sensor detection range is changed to the state where the object (for example, the person) is absent based on the output of the proximity sensor 130, the person detection unit 210 detects whether a person is present within the predetermined imaging range based on a captured image, and based on the detection result, detects a change from the state where a person is present to the state where the person is absent (i.e., the leave of the person from the electronic apparatus 1).

Thus, when the leave of a person is detected by the proximity sensor 130, since the electronic apparatus 1 checks on the presence or absence of the person based further on the captured image, the leave of the person from the electronic apparatus 1 can be detected accurately.

Further, the person detection unit 210 causes the imaging unit 120 to capture an image within the predetermined imaging range according to the fact that the change from the state where the object (for example, the person) present within the sensor detection range to the state where the object is absent is detected based on the output of the proximity sensor 130.

Thus, since the electronic apparatus 1 causes the imaging unit 120 to capture an image within the predetermined imaging range at the timing when the leave of a person is detected by the proximity sensor 130, there is no need to keep the imaging unit in operation, and hence power consumption can be reduced.

Here, the predetermined imaging range captured by the imaging unit 120 is a range wider than the sensor detection range of the proximity sensor 130.

Thus, since the electronic apparatus 1 can check on the presence or absence of a person using the captured image in the range wider than the sensor detection range of the proximity sensor 130, the leave of the person from the electronic apparatus 1 can be detected accurately.

Further, the electronic apparatus 1 includes the system processing unit 300 which executes system processing based on the system, and the operation control unit 220. Based on the detection result of the person detection unit 210, the operation control unit 220 instructs the system processing unit 300 to cause the operating state of the system to make the transition to the standby state (an example of a first operating state) in which at least part of system processing is limited.

Thus, the electronic apparatus 1 can detect the leave of a person from the electronic apparatus 1 accurately to cause the system to make the transition to the standby state.

Further, in the standby state, when the change from the state where no person is present to the state where a person is present (i.e., the approach of a person to the electronic apparatus 1) is detected by the person detection unit 210 based on the output of the proximity sensor 130, the operation control unit 220 instructs the system processing unit 300 to cause the operating state of the system to make a transition to the normal operating state (an example of a second operating state) in which the operating state is more activated (more system processing active) than the standby state.

Thus, since the electronic apparatus 1 uses only the detection result of the proximity sensor 130 when the approach of a person is detected in the standby state, there is no need to operate the imaging unit 120 in the standby state, and hence power consumption can be reduced. Further, since the approach of a person is detected in a narrow detection range of the proximity sensor 130. In this case, since it is less likely to erroneously detect a person who just passes nearby, the approach of a person to the electronic apparatus 1 can be detected accurately.

Second Embodiment

Next, a second embodiment of the present invention will be described.

In this embodiment, another example of leave detection processing will be described. Since the basic configuration of the electronic apparatus 1 according to this embodiment is the same as that illustrated in FIGS. 3 and 5, the description thereof will be omitted. Here, characteristic processing of the embodiment will be described. As described in the first embodiment, when the leave of a person is detected, the electronic apparatus 1 may cause the operating state of the system to make the transition to the standby state after waiting for a fixed period of time since the display unit 110 was controlled to the screen-OFF state (the display of a black image (or an image gradually turning black)) before the transition of the operating state of the system to the standby state. In this case, there is a possibility that the presence or absence of a person will be changed while the black image (or the image gradually turning black) is being displayed for the fixed period of time. Therefore, the electronic apparatus 1 may cause the imaging unit 120 to capture images respectively at the start and end times of the display of the black image (or the image gradually turning black) to detect whether a person is present within the imaging range or not in order to control the transition to the standby state.

Figure 9:
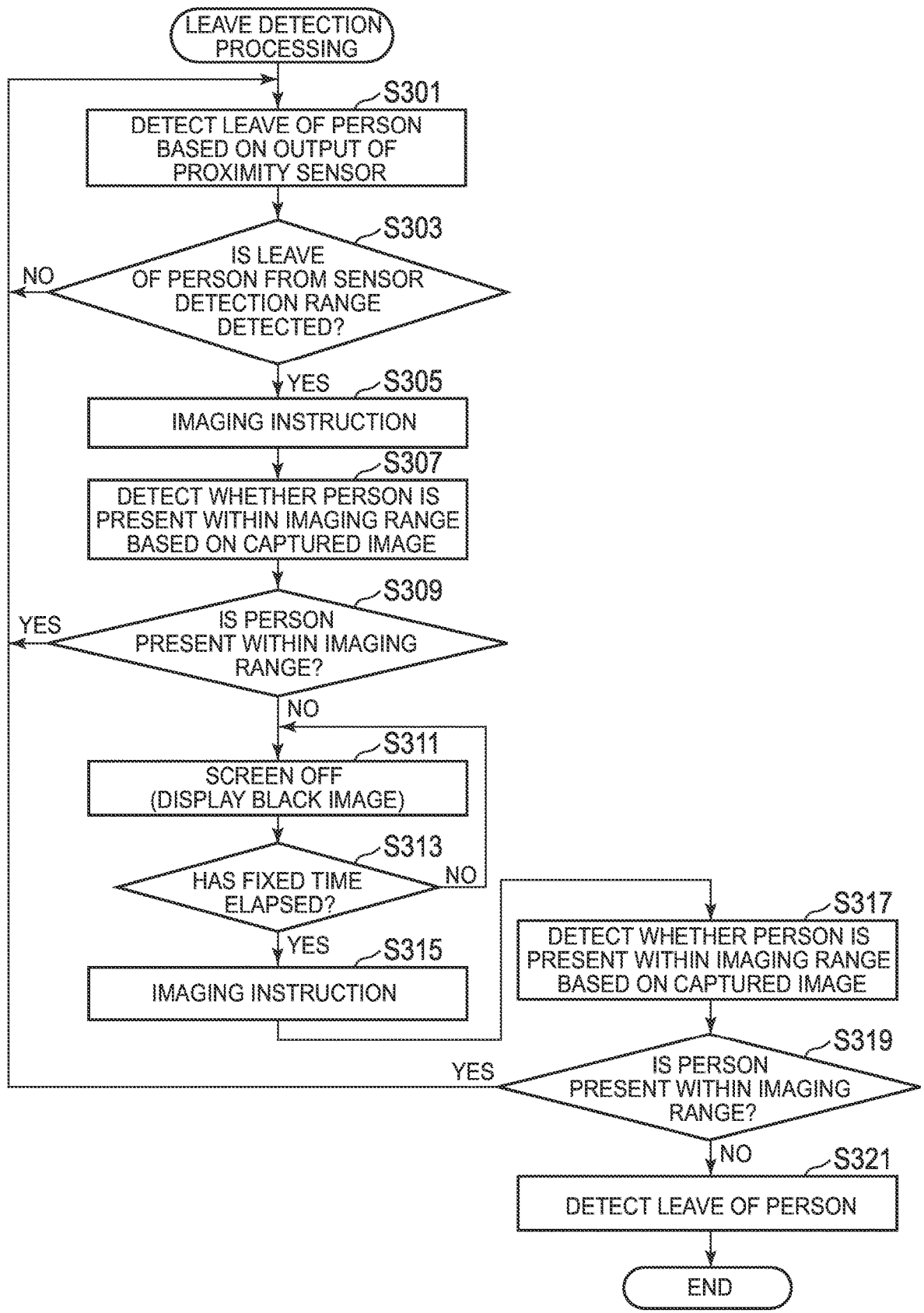
FIG. 9 is a flowchart illustrating an example of leave detection processing according to a second embodiment.

FIG. 9 is a flowchart illustrating an example of leave detection processing according to the embodiment.

(Step S301) Based on the output (detection signal) of the proximity sensor 130, the EC 200 detects whether a person present within the sensor detection range is changed to the state where the person is absent (i.e., the leave of the person from the sensor detection range). Then, the EC 200 proceeds to processing in step S303.

(Step S303) Based on the output (detection signal) of the proximity sensor 130, the EC 200 determines whether the person present within the sensor detection range is changed to the state where the person is absent (i.e., the leave of the person from the sensor detection range) or not. When determining that the person present within the sensor detection range remains present (NO), the EC 200 returns to the processing in step S301. On the other hand, when determining that the person present within the sensor detection range is changed to the state where the person is absent (YES), the EC 200 proceeds to processing in step S305.

(Step S305) The EC 200 causes the imaging unit 120 to capture an image (imaging instruction). Specifically, the person detection unit 210 sends the system processing unit 300 a control signal for causing the imaging unit 120 to capture an image to cause the imaging unit 120 to capture the image under the control of the system processing unit 300. Then, the procedure proceeds to processing in step S307.

(Step S307) The EC 200 detects whether a person is present within the imaging range based on a captured image captured by the imaging unit 120. Specifically, the EC 200 detects a face image from the captured image to detect whether the person is present within the imaging range. Then, the procedure proceeds to processing in step S309.

(Step S309) The EC 200 determines whether the person is present within the imaging range or not. When detecting the face image from the captured image, the EC 200 determines that the person is present within the imaging range (YES). In this case, since the person does not leave, the EC 200 returns to the processing in step 301. On the other hand, when detecting no face image from the captured image, the EC 200 determines that the person is absent within the imaging range (NO), and proceeds to processing in step S311.

(Step S311) The EC 200 instructs the system processing unit 300 to put the display unit 110 into a screen OFF state (to display a black image (or an image gradually turning black)). According to the above instruction, the system processing unit 300 controls the display unit 110 into the screen OFF state (to display a black image (or an image gradually turning black)). Then, the procedure proceeds to processing in step S313.

(Step S313) The EC 200 determines whether a fixed time has elapsed after giving the instruction to put the display unit 110 into the screen OFF state. Here, the elapsed time may be measured by the EC 200 or by the system processing unit 300. When determining that the fixed time has not elapsed (NO), the EC 200 continues this determination processing in step S313. On the other hand, when determining that the fixed time has elapsed (YES), the EC 200 proceeds to processing in step S315.

(Step S315) The EC 200 causes the imaging unit 120 to capture an image (imaging instruction). Specifically, the person detection unit 210 sends the system processing unit 300 a control signal for causing the imaging unit 120 to capture an image to cause the imaging unit 120 to capture an image under the control of the system processing unit 300. Then, the procedure proceeds to processing in step S317.

(Step S317) Based on the captured image captured by the imaging unit 120, the EC 200 detects whether a person is present within the imaging range or not. Specifically, the EC 200 detects a face image from the captured image to detect whether the person is present within the imaging range or not. Then, the EC 200 proceeds to processing in step S319.

(Step S319) The EC 200 determines whether the person is present within the imaging range or not. When detecting the face image from the captured image, the EC 200 determines that the person is present within the imaging range (YES). In this case, since the person does not leave (or the person is coming back after leaving), the EC 200 instructs the system processing unit 300 to release the screen OFF and returns to the processing in step 301. On the other hand, when detecting no face image from the captured image, the EC 200 determines that the person is absent within the imaging range (NO), and proceeds to processing in step S321.

(Step S321) Since it is determined that the person is absent within the imaging range, the EC 200 detects that the person has left the electronic apparatus 1. In response to this detection, the system processing unit 300 causes the operating state of the system to make the transition to the standby state (see S153 in FIG. 7).

The EC 200 may detect the presence or absence of a person within the sensor detection range based on the output (detection signal) of the proximity sensor 130 while the display unit 110 is being controlled to be the screen OFF. In this case, when detecting the state where the person is present, the EC 200 may instruct the system processing unit 300 to release the screen OFF and return to the processing in step 301.

Summary of Second Embodiment

As described above, the electronic apparatus 1 according to the embodiment is such that, when the change from the state where a person is present to the state where the person is absent (i.e., the leave of the person from the electronic apparatus 1) is detected by the person detection unit 210, the operation control unit 220 instructs the system processing unit 300 to cause the operating state of the system to make the transition to the standby state after instructing the system processing unit 300 to change the display content of the display unit on which a display image based on the system processing is displayed (for example, screen OFF). Further, the person detection unit 210 causes the imaging unit 120 to capture images, respectively, when the change in the display content of the display unit (for example, screen OFF) is instructed and when the transition to the standby state is instructed, and detects the change from the state where a person is present to the state where the person is absent (i.e., the leave of the person from the electronic apparatus 1) based on the captured images.

Thus, since the electronic apparatus 1 can let the user know the transition to the standby state in advance by turning the screen OFF (for example, providing a black display (or providing a display gradually turning black)) before the transition to the standby state, and detect the presence or absence of a person using captured images plural times before the transition to the standby state, the transition to the standby state due to erroneous detection can be reduced. Note that the number of times the presence or absence of a person is detected using captured images before the transition to the standby state is not limited to twice, and it may be three times or more.

While the first and second embodiments of this invention have been described in detail above with reference to the accompanying drawings, the specific configuration is not limited to the above-described embodiments, and design changes shall be included without departing from the scope of this invention. For example, respective components described in the above-described embodiments can be combined arbitrarily.

Further, the person detection unit 210 may detect the leave of a person from the electronic apparatus 1 by using trained data (trained model) obtained by machine learning using, as a training data set, the detection result of the presence of a person based on the output of the proximity sensor 130 and the detection result of the presence of a person based on the captured image(s). For example, the person detection unit 210 may set, in a neural network for learning, the detection result of the leave of the person detected based on the output of the proximity sensor 130 as an input variable input to an input layer, and the detection result of the presence or absence of the person based on the captured image(s) as an output variable output from an output layer to perform machine learning. Note that the above machine learning process may be any process other than the neural network, such as a process using supervised learning, unsupervised learning, or reinforcement learning.

Further, in the above embodiments, the configuration example in which the imaging unit 120 is incorporated in the electronic apparatus 1 has been described, but the configuration is not limited thereto. For example, the imaging unit 120 does not have to be incorporated in the electronic apparatus 1, which may be adapted to be able to be attached to the electronic apparatus 1 (for example, on any of the side faces 10a, 10b, 10c, and the like) as an external accessory of the electronic apparatus 1, and connected communicably to the electronic apparatus 1 wirelessly or by wire. Likewise, the proximity sensor 130 does not also have to be incorporated in the electronic apparatus 1, which may also be adapted to be able to be attached to the electronic apparatus 1 (for example, on any of the side faces 10a, 10b, 10c, and the like) as an external accessory of the electronic apparatus 1, and connected communicably to the electronic apparatus 1 wirelessly or by wire. Further, the imaging unit 120 and the proximity sensor 130 may be integrally formed as an external accessory.

Further, in the above embodiments, the configuration example in which the imaging unit 120 is incorporated in the electronic apparatus 1 has been described, but the configuration is not limited thereto. For example, the imaging unit 120 does not have to be incorporated in the electronic apparatus 1, which may be connected to the electronic apparatus 1 wirelessly or by wire as an external accessory.

Further, in the above embodiments, the EC 200 configured to operate independently of the system processing unit 300 may be any processing unit such as a sensor hub or a chipset, and the above-described processing may be executed by any processing unit other than the EC 200 instead of the EC 200. It is usually the case that the sum of power consumption of the processing unit such as this EC 200 and the proximity sensor 130 is significantly less than the power consumption of the system processing unit 300.

Further, in the standby state described above, a hibernation state, a power-off state, or the like may also be included. The hibernation state corresponds, for example, to S4 state defined in the ACPI specification. The power-off state corresponds, for example, to S5 state (shutdown state) defined in the ACPI specification. Further, the standby state may include a state in which at least the display of the display unit appears to be OFF (screen OFF) or a screen lock state. The screen lock is a state where an image preset to make a processed content invisible (for example, an image for the screen lock) is displayed on the display unit to indicate that the system is unusable until the lock is released (for example, user authentication is performed).

Note that the electronic apparatus 1 described above has a computer system therein. Then, a program for implementing the function of each component included in the electronic apparatus 1 described above may be recorded on a computer-readable recording medium so that the program recorded on this recording medium will be read into the computer system and executed to perform processing in each component included in the electronic apparatus 1 described above. Here, the fact that "the program recorded on the recording medium is read into the computer system and executed" includes installing the program on the computer system. It is assumed that the "computer system" here includes the OS and hardware such as a peripheral device and the like. Further, the "computer system" may also include two or more computers connected through a network including the Internet, WAN, LAN, and a communication line such as a dedicated line. Further, the "computer-readable recording medium" means a storage medium such as a flexible disk, a magneto-optical disk, a ROM, a portable medium like a CD-ROM, or a hard disk incorporated in the computer system. The recording medium with the program stored thereon may be a non-transitory recording medium such as the CD-ROM.

A recording medium internally or externally provided to be accessible from a delivery server for delivering the program is included as the recording medium. Note that the program may be divided into plural pieces, downloaded at different timings, respectively, and then united in each component included in the electronic apparatus 1, or delivery servers for delivering respective divided pieces of the program may be different from one another. Further, the "computer-readable recording medium" includes a medium on which the program is held for a given length of time, such as a volatile memory (RAM) inside a computer system as a server or a client when the program is transmitted through the network. The above-mentioned program may also be to implement some of the functions described above. Further, the program may be a so-called differential file (differential program) capable of implementing the above-described functions in combination with a program(s) already recorded in the computer system.

Further, some or all of the functions of the electronic apparatus 1 in the above-described embodiments may be realized as an integrated circuit such as LSI (Large Scale Integration). Each function may be a processor implemented individually, or part or whole thereof may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Further, the electronic apparatus 1 in the above-described embodiments is not limited to a PC, a tablet terminal, or a smartphone, and the present invention can also be applied to a household electric appliance or a commercial electric appliance. As the household electric appliance, the present invention can be applied to a TV set, a refrigerator or a microwave oven having a display unit, or the like. For example, ON/OFF of a TV screen or ON/OFF of a screen of the display unit of the refrigerator or the microwave oven can be controlled in response to the approach or leave of a person. As the commercial electric appliance, the present invention can be applied to a vending machine, a multimedia station, or the like. For example, an operating state such as ON/OFF of lighting of the vending machine or ON/OFF of a screen of a display unit of the multimedia station can be controlled in response to the approach or leave of a person.

The invention claimed is:

1. An electronic apparatus comprising:
a detection unit that detects a change from a state where a person is present in relation to the electronic apparatus to a state where the person is absent in relation to the electronic apparatus, wherein the detection is based on output of a distance sensor which detects an object present within a predetermined detection range, and a captured image covering a predetermined imaging range;
a system processing unit which executes system processing based on a system;
an operation control unit which, based on the detection result of the detection unit, instructs the system processing unit to cause an operating state of the system to make a transition to a first operating state in which at least part of the system processing is limited;
when the change from the state where a person is present to the state where the person is absent is detected by the detection unit, the operation control unit instructs the system processing unit to cause the operating state of the system to make the transition to the first operating state after instructing the system processing unit to change a display content of a display unit on which a display image based on the system processing is displayed, and
the detection unit causes an imaging unit to capture images, respectively, when the change in the display content of the display unit is instructed and when the transition to the first operating state is instructed, and detects the change from the state where a person is present to the state where the person is absent based on the captured images.

2. The electronic apparatus according to claim 1, wherein, when it is detected that an object present within the predetermined detection range is changed to a state where the object is absent based on the output of the distance sensor, the detection unit detects whether a person is present within the predetermined imaging range or not based on the captured image, and based on the detection result, detects the change from the state where a person is present to the state where the person is absent.

3. The electronic apparatus according to claim 1, wherein the detection unit causes the imaging unit to capture an image within the predetermined imaging range according to the change from the state where an object is present within the predetermined detection range to the state where the object is absent which is detected based on the output of the distance sensor.

4. The electronic apparatus according to claim 1, wherein the predetermined imaging range is a range wider than the predetermined detection range.

5. The electronic apparatus according to claim 1, wherein, when a change from a state where a person is absent to a state where the person is present is detected in the first operating state by the detection unit which is based on the output of the distance sensor, the operation control unit instructs the system processing unit to make a transition to a second operating state in which operation of the system is more active than that in the first operating state.

6. A control method for an electronic apparatus, comprising:
a step of causing a detection unit to acquire output of a distance sensor to detect an object present within a predetermined detection range;
a step of causing the detection unit to acquire a captured image captured within a predetermined imaging range; and
a step of causing the detection unit to detect a change from a state where a person is present in relation to the electronic apparatus to a state where the person is absent in relation to the electronic apparatus, which is based on the output of the distance sensor and the captured image;
a step of causing a system processing unit to execute system processing based on a system;
a step of causing an operation control unit which, based on the detection result of the detection unit, to instruct the system processing unit to cause an operating state of the system to make a transition to a first operating state in which at least part of the system processing is limited;
when the change from the state where a person is present to the state where the person is absent is detected by the detection unit, a step of causing the operation control unit to instruct the system processing unit to cause the operating state of the system to make the transition to the first operating state after instructing the system processing unit to change a display content of a display unit on which a display image based on the system processing is displayed, and
a step of causing the detection unit to cause an imaging unit to capture images, respectively, when the change in the display content of the display unit is instructed and when the transition to the first operating state is instructed, and detects the change from the state where a person is present to the state where the person is absent based on the captured images.

7. An electronic apparatus comprising:
an embedded processor programmed to detect a change from a state where a person is present in relation to the electronic apparatus to a state where the person is absent in relation to the electronic apparatus, wherein the embedded processor detects based on output of a distance sensor which detects an object present within a predetermined detection range, and a captured image covering a predetermined imaging range;
a system processor programmed to execute system processing based on a system;
the embedded processor which, based on the detected change, is further programmed to instruct the system processor to cause an operating state of the system to make a transition to a first operating state in which at least part of the system processing is limited;
when the change from the state where a person is present to the state where the person is absent is detected by the embedded processor, the embedded processor is further programmed to instruct the system processor to cause the operating state of the system to make the transition to the first operating state after instructing the system processor to change a display content of a display on which a display image based on the system processing is displayed, and the embedded processor is further programmed to cause a camera to capture images, respectively, when the change in the display content of the display is instructed and when the transition to the first operating state is instructed, and to detect the change from the state where a person is present to the state where the person is absent based on the captured images.

* * * * *